United States Patent [19]

Drinkut et al.

[11] Patent Number: 4,900,959

[45] Date of Patent: Feb. 13, 1990

[54] INSULATED OUTER ROTOR FOR BRUSHLESS EXCITER

[75] Inventors: Samuel A. Drinkut, Winter Park; James R. Pipkin, Orlando; Lon W. Montgomery, Winter Springs, all of Fla.

[73] Assignee: Westinghouse Electric Corp., Pittsburgh, Pa.

[21] Appl. No.: 294,097

[22] Filed: Jan. 6, 1989

[51] Int. Cl.[4] ............................................. H02K 11/00
[52] U.S. Cl. ................................ 310/68 D; 310/60 A; 310/67 R; 310/114
[58] Field of Search ..................... 310/58, 60 R, 60 A, 310/67 R, 68 D, 112, 114

[56] References Cited

U.S. PATENT DOCUMENTS

| | | | |
|---|---|---|---|
| 972,850 | 10/1910 | Gray | 310/60 A |
| 4,617,484 | 10/1986 | Buijsen | 310/67 R |
| 4,647,806 | 3/1987 | Giuffrida | 310/68 D |
| 4,797,590 | 1/1989 | Raad et al. | 310/68 D |

Primary Examiner—Patrick R. Salce
Assistant Examiner—D. L. Rebsch
Attorney, Agent, or Firm—M. G. Panian

[57] ABSTRACT

In a generator exciter composed of a stator (12) for producing a dc field and a rotor (16, 18) mounted to rotate relative to the stator (12) and including armature windings (18) connected to generate ac output currents, the rotor (16, 18) is mounted radially outwardly of the stator (12), and is insulated from its support.

7 Claims, 1 Drawing Sheet

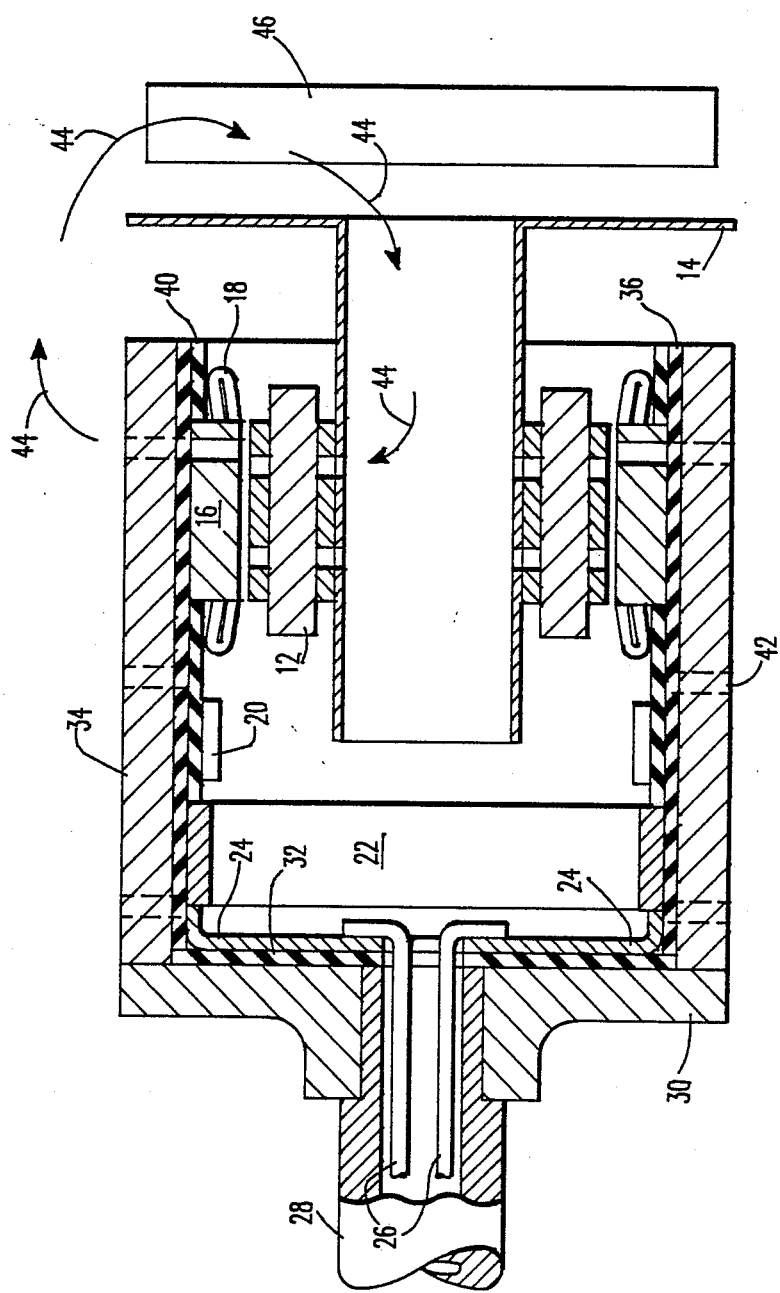

INSULATED OUTER ROTOR FOR BRUSHLESS EXCITER

BACKGROUND OF THE INVENTION

The present invention relates to brushless exciters for generators.

Conventional power generators include an exciter which is normally mounted at one end of the generator rotor shaft. Known exciters include a rotor mounted on the shaft of the generator rotor and provided with armature windings, rectifier components and output conductors via which a direct current is supplied to the generator rotor windings. The exciter rotor is enclosed by a stator provided with components which produce a stationary magnetic field.

In exciters of this type, the armature windings include end turns which must be securely supported, typically by fiber glass bands, in order to resist the centrifugal forces imposed thereon during generator operation. Manufacture of the rotor is made difficult by the fact that only a limited space is available for the armature windings. This limited space and the presence of supporting bands on the armature winding end turns additionally increase cooling problems.

Furthermore, because of various inherent structural limitations, including the desire to minimize the centrifugal forces imposed on the rotor armature winding end turns, the diameter of the exciter air gap must be maintained at a relatively small value.

SUMMARY OF THE INVENTION

It is an object of the present invention to eliminate, or substantially minimize, the above-noted drawbacks.

A specific object of the invention is to improve the support of exciter rotor armature windings, and particularly their end turns, while providing increased space for installation of those windings.

A further specific object of the invention is to permit the air gap diameter of an exciter having given external dimensions to be increased.

Another object of the invention is to enable an exciter having a given rating to have a reduced axial dimension, which permits the exciter to be mounted in a cantilever manner.

The above and other objects are achieved, according to the present invention, in a generator exciter comprising a stator for producing a DC field and a rotor mounted to rotate relative to the stator and including armature windings connected to generate AC output currents, in that the rotor is mounted radially outwardly of the stator.

BRIEF DESCRIPTION OF THE DRAWING

The FIGURE illustrates one preferred embodiment of an exciter according to the present invention whose basic components are an internal stator and an external rotor.

DESCRIPTION OF THE PREFERRED EMBODIMENTS

The exciter shown in the FIGURE includes a stator constituted of a salient pole field 12 constructed according to principles known in the art. Field 12 is mounted on a field support tube 14 which, in turn, is supported by the exciter housing (not shown). Field 12 provides a DC magnetic field.

Surrounding field 12 is the exciter rotor, which is composed of an armature core 16 carrying armature windings 18 which include winding end turns as shown. The exciter rotor further carries an assembly composed of parallel rings and a neutral bus 20 connected to windings 18, as well as a ring of rectifier bridges 22 which derive a direct current from the alternating currents induced in armature winding 18. The array of rectifier bridges 22 alternates in polarity around the circumference of the rotor and the positive and negative output direct currents from bridges 22 are supplied to respective direct current collection rings. The collection ring associated with each direction of current flow is connected to a respective radial strap 24 which is, in turn, connected to a respective direct current conductor 26 which extends axially through generator rotor shaft 28 in order to supply direct current to field winding terminals of the associated generator.

The exciter rotor is mechanically coupled to generator rotor shaft 28 by an annular coupling 30 whose inner edge is preferably shrunk fit onto shaft 28. Straps 24 are insulated from coupling 30 by a suitable insulating disk 32.

The radial outer edge of coupling 30 is bolted to a high strength retaining cylinder 34 which supports armature core 16, the end turns of winding 18, parallel rings and neutral bus 20 and rectifier bridges 22. Because retaining cylinder 34 is disposed to the outside of the exciter assembly, it can be dimensioned to provide the desired degree of mechanical support for the rotating components, and particularly for the end turns of windings 18, thereby eliminating the need for any additional components, such as bands, to support those end turns and facilitating direct ventilation of the entire exciter armature winding. Cylinder 34 can be made of a high strength steel, which may be a magnetic steel.

The interior surface of cylinder 34 is lined with an insulating sleeve 36 which may be of an epoxy material such as that marketed under the trade name Micarta. Sleeve 36 provides insulating support for armature core 16 and its associated windings 18, as well as for parallel rings and neutral bus 20 and rectifier bridges 22.

Additional insulating support is provided for windings 18 and parallel rings and neutral bus 20 by an inner insulating sleeve 40, which can be of the same composition as sleeve 36.

All of the rotating components and the stationary components are provided with radial vent passages, such as shown at 42, for the radial flow of cooling. This cooling air is propelled by the rotation of the exciter rotor to produce a cooling air circulation along paths such as indicated generally by arrows 44. The number of radial vent passages employed in practice will be greater than those illustrated in the drawing. These vent passages permit forced air cooling of not only field 12, armature core 16 and armature windings 18, but also of rings and bus 20 and rectifier bridges 22. Because the end turns of windings 18 need not be provided with any retaining or support members other than those described above, direct ventilation thereof becomes possible.

To further aid in cooling the exciter, there may be disposed, within the exciter housing, a heat exchanger 46 over which the circulating air passes.

With the arrangement illustrated in the FIGURE, rotor windings 18, and particularly their end turns, are fully supported by retaining cylinder 34, through the intermediary of sleeves 36 and 40, and since these components are disposed radially to the outside of windings 18, they fully support all centrifugal forces experienced by those windings. Therefore, additional banding or other support for the end turns of windings 18 are not required.

Moreover, this arrangement makes available a substantial space for armature windings 18 and thereby simplifies assembly problems.

Furthermore, because armature core 16 and armature windings 18 are disposed radially outwardly of the stator, the air gap between field 12 and armature core 16 can be given a relatively large diameter. Because of the larger diameter air gap made possible by the invention, an exciter having a given rating can be made axially shorter than known exciters and this, in turn, can permit a cantilever mounting of the rotor, as shown. However, if needed, the end of the exciter remote from shaft 28 can additionally be mounted on a support bearing.

In addition, retaining cylinder 34 provides integrated support for all ac and dc conductors.

The construction according to the present invention additionally opens the possibility of constructing an associated permanent magnet generator so that it is mounted on generator shaft 28 and is located on either the end of generator shaft 28 which is driven, for example by a turbine, or on the end of shaft 28 which is coupled to the exciter.

In the FIGURE, the components 20 and 22 are shown only schematically because it is intended that they be constructed and connected in accordance with conventional practice in the art. The rectifier bridges could, for example, be constituted by known diode-capacitor-fuse modules, or fuseless double diode modules. The ac side of the rectifier bridges is connected to the high voltage end of each armature winding phase. For a star or wye wound armature, the armature phase neutrals can all be connected together, axially adjacent armature windings 18, via rings and bus 20.

The Micarta (TM) sleeves 36 and 40 serve to reduce high frequency eddy current heating and losses in the various steel components and these sleeves serve to separate all of the ac conductors mounted on the rotor from high strength retaining ring 34.

The dc sides of bridges 22 are connected to respective direct current collection rings, as described above.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a generator exciter comprising a stator for producing a dc field and a rotor mounted to rotate relative to the stator and including armature windings connected to generate ac output currents, said rotor comprising a high strength retaining cylinder located radially outwardly of, and supporting, said armature windings, and an insulating material being interposed between said retaining cylinder and said armature windings, wherein said rotor is mounted radially outwardly of said stator.

2. An exciter as defined in claim 1 wherein said rotor is supported via only one axial end thereof.

3. An exciter as defined in claim 1 wherein said rotor further comprises a support ring disposed at one end of said rotor and having a radial outer portion supporting said retaining cylinder and a radial inner portion for mounting on a generator shaft.

4. An exciter as defined in claim 1 wherein said rotor further comprises electronic means supported by said retaining cylinder via said insulating sleeve and connected to said armature windings for converting the output currents produced by said armature windings into a direct current.

5. An exciter as defined in claim 1 wherein said stator and said rotor are provided with radial ventilation passages for the flow of cooling air driven by rotation of said rotor.

6. An exciter as defined in claim 5 wherein said armature windings include winding end turns which are supported by said retaining cylinder and are exposed to the flow of cooling air.

7. An exciter as defined in claim 5 wherein said rotor is supported via only one axial end thereof.

* * * * *